US011216459B2

(12) United States Patent
Zhang et al.

(10) Patent No.: US 11,216,459 B2
(45) Date of Patent: Jan. 4, 2022

(54) MULTI-LAYER SEMANTIC SEARCH

(71) Applicant: Microsoft Technology Licensing, LLC, Redmond, WA (US)

(72) Inventors: Minjia Zhang, Kirkland, WA (US); Yuxiong He, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 251 days.

(21) Appl. No.: 16/363,822

(22) Filed: Mar. 25, 2019

(65) Prior Publication Data

US 2020/0311077 A1    Oct. 1, 2020

(51) Int. Cl.
*G06F 16/00* (2019.01)
*G06F 16/2453* (2019.01)
*G06F 16/2457* (2019.01)
*G06F 3/06* (2006.01)

(52) U.S. Cl.
CPC ........ *G06F 16/24542* (2019.01); *G06F 3/068* (2013.01); *G06F 3/0611* (2013.01); *G06F 3/0644* (2013.01); *G06F 16/24578* (2019.01)

(58) Field of Classification Search
CPC ............. G06F 16/24542; G06F 3/0611; G06F 16/24578; G06F 3/068; G06F 3/0644; G06F 16/3347
See application file for complete search history.

(56) References Cited

U.S. PATENT DOCUMENTS

| | | | |
|---|---|---|---|
| 6,189,002 B1 * | 2/2001 | Roitblat | G06F 16/30 |
| 6,523,026 B1 * | 2/2003 | Gillis | G06F 16/3332 |
| 6,633,882 B1 * | 10/2003 | Fayyad | G06F 16/283 |
| 2008/0021860 A1 * | 1/2008 | Wiegering | G06F 16/951 |
| 2009/0157652 A1 * | 6/2009 | Barbosa | G06F 16/3347 |
| 2012/0023073 A1 * | 1/2012 | Dean | G06F 16/355 707/693 |
| 2013/0124488 A1 * | 5/2013 | Kang | G06F 16/9024 707/693 |
| 2016/0299920 A1 * | 10/2016 | Feng | G06F 16/5838 |
| 2018/0329993 A1 * | 11/2018 | Bedadala | G06F 16/632 |
| 2019/0354878 A1 * | 11/2019 | Acar | G06F 16/24569 |

* cited by examiner

*Primary Examiner* — Syed H Hasan
(74) *Attorney, Agent, or Firm* — Medley, Behrens & Lewis, LLC

(57) ABSTRACT

A method for semantic search includes receiving a query vector including a semantic feature value for each of a plurality of semantic feature dimensions. A cluster is selected from a plurality of different candidate clusters held in a relatively fast memory, each candidate cluster including a plurality of compressed answer vectors. A subset of the plurality of compressed answer vectors are promoted as candidate answers. For each of the candidate answers, a corresponding uncompressed answer vector is retrieved from a relatively slower memory. A selected answer is promoted from among the candidate answers.

20 Claims, 6 Drawing Sheets

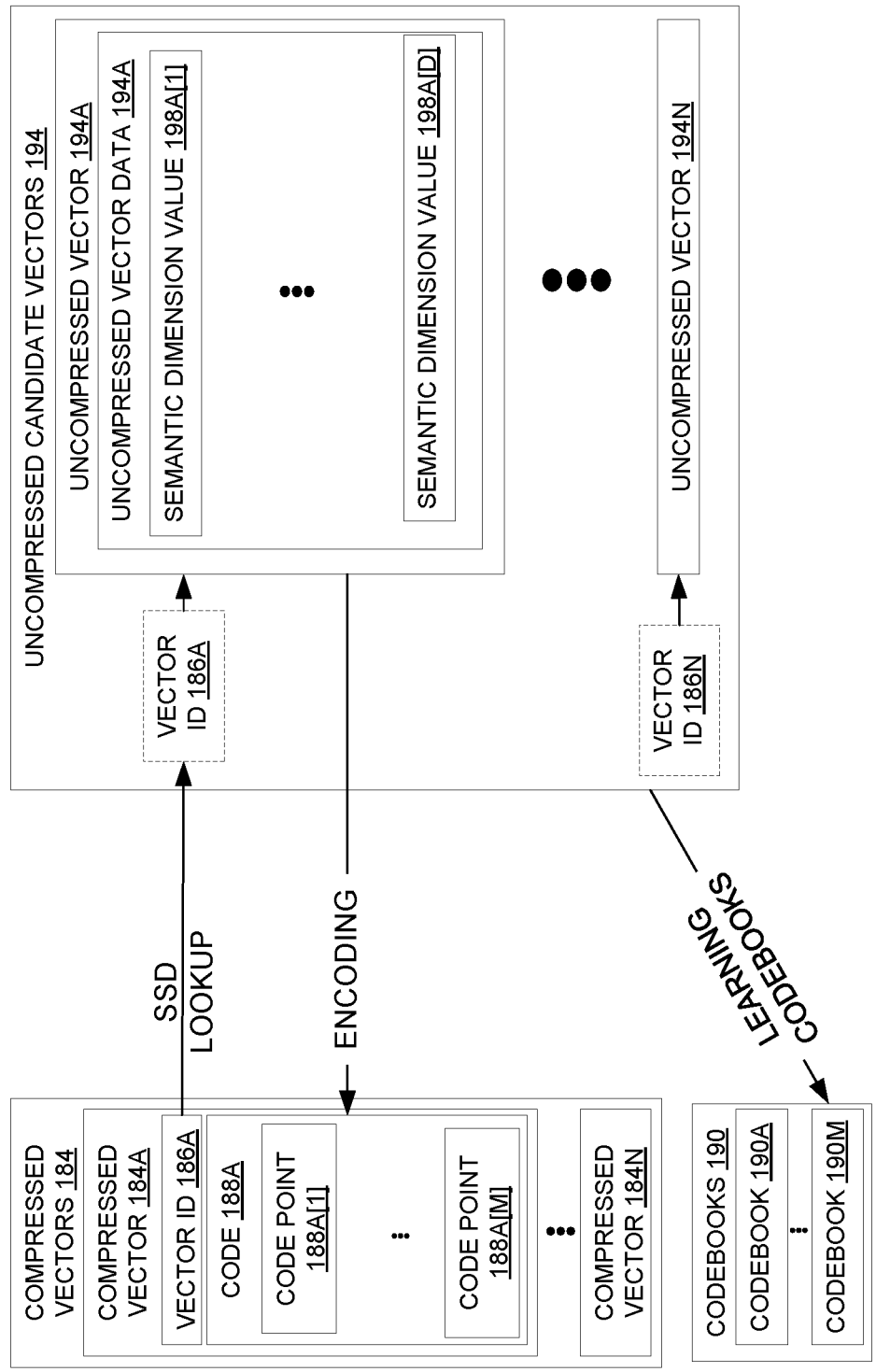

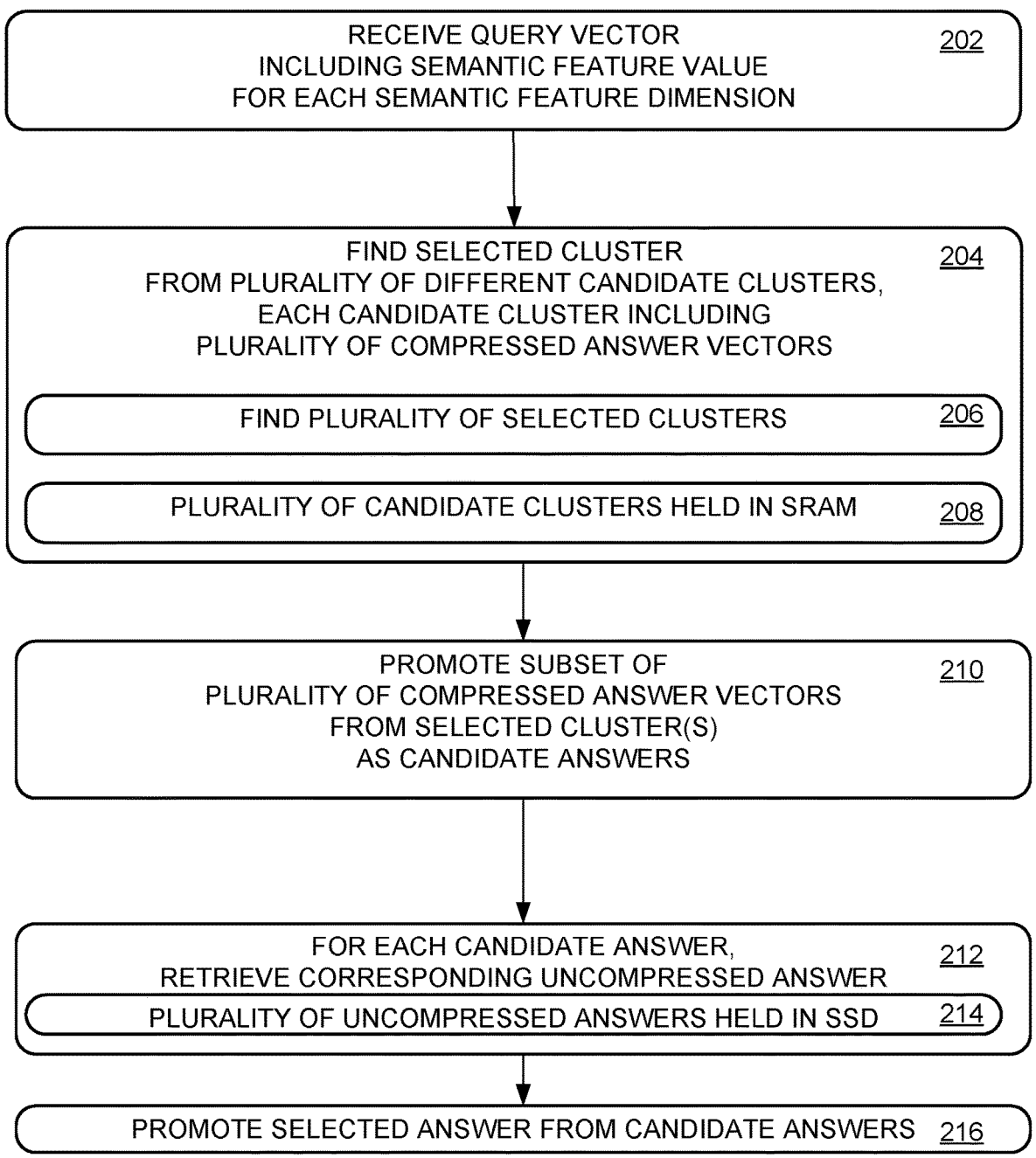

MULTI-LAYER SEMANTIC SEARCH

BACKGROUND

Semantic data (e.g., collections of facts, multimedia, etc.) may be represented as a plurality of vectors in a semantic vector space. The plurality of vectors may be searched based on geometric properties of the vector space to find facts based on semantic properties, for example for answering queries. However, searching the plurality of vectors may present a large computational burden.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for semantic search includes receiving a query vector including a semantic feature value for each of a plurality of semantic feature dimensions. A cluster is selected from a plurality of different candidate clusters held in a relatively fast memory, each candidate cluster including a plurality of compressed answer vectors. A subset of the plurality of compressed answer vectors are promoted as candidate answers. For each of the candidate answers, a corresponding uncompressed answer vector is retrieved from a relatively slower memory. A selected answer is promoted from among the candidate answers.

BRIEF DESCRIPTION OF THE DRAWINGS

FIG. 1C shows an exemplary compression scheme.

FIG. 2 shows a method for performing semantic search.

DETAILED DESCRIPTION

Figure 1A:
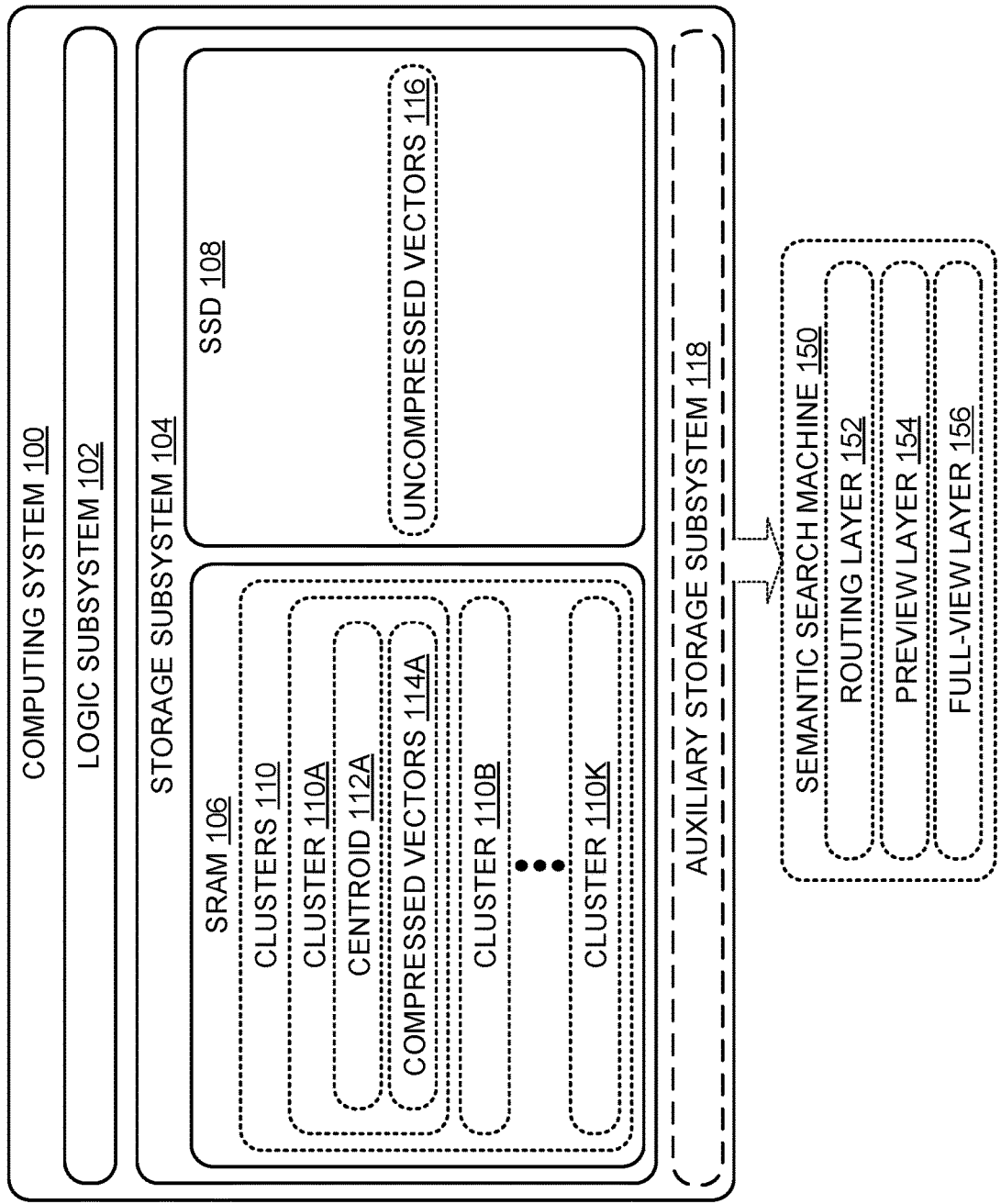
FIG. 1A shows an exemplary computer system for semantic search.

Computer systems are increasingly used to access semantic content. Semantic content includes factual information, multimedia content, and other content that may be regarded as having semantic value.

Semantic content may be grouped into particular categories having content of a same "type." Non-limiting examples of semantic categories include facts about people (e.g., name, location information, image data for photographic identification, etc.), facts about places (e.g., location, scheduled events, photos, etc.), historical facts, facts about multimedia content (e.g., fictional character biographies, movie credits), words, word definitions, speech sounds, etc. In many examples, multiple different semantic content may be associated to represent any suitable relationship such as identity, association, authorship, co-occurrence, etc. For example, semantic content may be associated so as to link words with speech sounds, people names with photographic information, actor names with photos of movie characters played by that actor, etc.

In some examples, semantic content may be represented in the form of semantic vectors in a semantic vector space. The semantic space includes a plurality of semantic feature dimensions. Each semantic feature dimension represents an aspect of semantic entities in a semantic category. Accordingly, a semantic vector may represent a particular semantic entity in the semantic category, having a particular defined value for each aspect.

Semantic spaces may have any suitable number of semantic feature dimensions. In some examples, some feature dimensions of the semantic space may have a readily interpretable meaning, e.g., size, color, aspect ratio. However, in general, feature dimensions may not have a readily interpretable meaning. Nevertheless, in many examples, semantic vectors may be geometrically distributed throughout a semantic space so that geometric properties of the semantic space are related to semantic properties of the semantic entities represented by the semantic vectors. For example, in a semantic space for words, words having similar meanings may be represented by vectors that are geometrically close by Euclidean distance in the semantic space. In another example, in a semantic space for facts for web search query/answering, related candidate answers for queries may be geometrically close in the semantic space. In some examples, facts from multiple different semantic categories may be represented in one or more semantic spaces having a mathematical relationship (e.g., a mapping function), thereby facilitating retrieval of related facts from different semantic categories. For example, word text and word speech sounds may be represented by vectors in related semantic spaces, so as to facilitate speech recognition by associating word speech sounds to word text.

In some examples, semantic vectors may be generated by any suitable artificial intelligence (AI) and/or machine learning (ML) model(s). Furthermore, AI and/or ML models may be used to model semantic spaces, implement mapping functions between semantic vectors/semantic spaces, process semantic vectors to output other data (e.g., classification data, confidence data, speech output data, and the like) and/or generate semantic vectors to populate semantic spaces. Accordingly, semantic search may be suitable as a pre- and/or post-processing step in numerous computer systems, particularly those that use AI and/or ML. In some examples, semantic vectors may be generated by operating one or more trained models with regard to input semantic values (e.g., text, images, etc.) in order to generate one or more outputs and/or intermediate values of the model(s), in the form of vectors in a semantic space defined by a plurality of semantic feature values defined by the model(s). For example, a model including a neural network which is previously trained with regard to an image classification task may be operated to generate semantic vectors representing images. In an example, the neural network generates semantic vectors by supplying input images to the neural network (e.g., in the form of vectors representing rows or columns of images and/or in the form of matrices representing two-dimensional pixel values of images) and an intermediate activation value output by a layer of the neural network is a semantic vector in a semantic space defined by the neural network. In some examples, geometrically close semantic vectors in the semantic space may represent similar images, e.g., images of dogs may be clustered close together in the semantic space, while images of cats may be in a separate cluster, and images of lizards in a separate cluster even further away in the semantic space. Further examples of ML and/or AL models are described below.

Utilizing semantic vectors and/or semantic spaces may require performing a semantic search to find geometrically related semantic vectors from a collection of semantic vectors. For example, semantic search may be used for semantic spaces described above, e.g., for associating words/sounds, searching facts such as queries/answers, searching for similar photos, etc. In many examples, semantic search may be subject to stringent design constraints, e.g., accuracy, latency and memory footprint requirements. For example, semantic search for a web search application may be required to return answers within a very short time, using only modest memory consumption. For example, a web search application may require responses within at most tens of milliseconds.

In order to achieve sufficiently small desired response latencies, semantic search may incur many accesses to memory. Accordingly, semantic search may be implemented at least partially using one or more primary memory devices for holding data for semantic search. In some examples, the primary memory devices include random-access memory (RAM) devices. RAM may include static random-access memory (SRAM), dynamic random-access memory (DRAM), and/or any other memory technologies that are configured for randomly accessing (e.g., addressing, storing to, and/or loading from) the memory. In some examples, the RAM may include different memory devices with different relative access speeds. For example, the RAM may include SRAM having relatively faster access speed (e.g., smaller access latency and/or higher throughput), along with DRAM having relatively lower access speed (e.g., higher access latency and/or lower throughput). For example, computers executing semantic search for a web search application may have only 8 G, 4 G, 2 G, or less RAM (random-access memory) available for conducting semantic search.

Auxiliary memory other than RAM may be used to satisfy constraints for a web search application implementation, e.g., to increase total available memory for holding data for semantic search, while satisfying constraints on memory access speed, power cost, and/or monetary cost of hardware. For example, in addition to a primary memory device such as RAM, auxiliary memory such as hard disk or solid state drive (SSD) may be used for additional storage. However, a primary memory device such as RAM may offer faster access speeds relative to an auxiliary memory device such as SSD. Accordingly, such auxiliary memory technologies may incur a much larger latency for accessing data as compared to RAM (e.g., tens or hundreds of times more latency). In semantic search according to the present disclosure, data for the semantic search is selectively distributed across the primary memory device and the auxiliary memory device so as to reduce memory usage, to reduce response latency for semantic search, and/or to improve accuracy of the semantic search. For example, as will be described in more detail below, response latency for semantic search may be reduced by storing portions of the data being searched in the primary memory device, since the primary memory device may offer faster access speeds relative to the auxiliary memory device.

Although the present disclosure is described with regard to a storage device including a primary memory device implemented via RAM and an auxiliary storage device implemented via SSD, any other suitable storage technologies may be used for the primary memory device instead of or in addition to RAM, and any other suitable storage technologies may be used for the auxiliary memory device instead of or in addition to SSD. The potential benefits described herein (e.g., with regard to memory usage, response latency for semantic search, and/or accuracy) may be increased as a relative speed difference between the primary memory device and the auxiliary memory device is increased.

Semantic search may be formulated as a "nearest neighbor" problem in a semantic space, given an input query vector. For example, semantic search may include finding true nearest neighbors, e.g., by exhaustively searching each possible neighbor of the query vector. However, although exhaustive search has perfect accuracy, exhaustive search may be prohibitive in terms of latency and/or memory consumption. Accordingly, semantic search may be done as an approximate search, e.g., in which true nearest neighbors are returned with high likelihood, and/or the vectors that are found are close to the true nearest neighbors with high likelihood.

With regard to accuracy, semantic search may be desired to have at least a threshold accuracy for returning true nearest neighbors. For example, semantic search may be desired to return true nearest neighbors with a high likelihood, e.g., >95% of the time or >99% of the time. "Accuracy" as used herein includes any suitable measurements of accuracy, including proportion of correct answers out of all answers, precision, recall, area-under-curve for receiver operating characteristic curve, etc.

Accordingly, the present disclosure includes a computer system and methodology for conducting semantic search which is configured to find true nearest neighbors with high likelihood, while nevertheless reducing latency and memory consumption relative to other approaches having similar accuracy.

Semantic search according to the present disclosure is performed in a semantic search machine 150 including three layers: routing layer 152, preview layer 154, and full-view layer 156. In the routing layer 152, the search finds one or more cluster(s) of candidate semantic vectors. In the preview layer 154, a smaller refined set of candidate vectors that has a high probability of containing the true nearest neighbor is generated. In the full-view layer 156, the smaller refined set is searched to deterministically find the absolute best candidate of the smaller refined set.

It is believed that semantic search according to the present disclosure may achieve >95% accuracy, while nevertheless using at most 2 G of RAM and incurring latency of at most 5 ms, for an exemplary web ranking workload including semantic search of 80 million or more, 64-dimensional feature vectors.

FIG. 1 shows a computing system 100 configured for semantic search according to the present disclosure. Computing system 100 includes a logic subsystem 102 and a storage subsystem 104.

Storage system 104 includes a RAM 106 and an SSD 108 configured to hold data, e.g., semantic vectors for semantic search. RAM 106 may include any suitable combination of memory technologies, for example, DRAM and/or SRAM. In an example, RAM 106 includes a DRAM configured to hold the data, and further includes an SRAM cache configured to temporarily cache a portion of the data for faster access. Storage subsystem 104 may be further configured to hold instructions for semantic search, e.g., storage subsystem holds instructions executable by the logic subsystem to instantiate a semantic search machine 150, and/or to execute method 200 as described in more detail with regard to FIG. 2. In some examples, the instructions are held by an auxiliary storage subsystem 118, e.g., additional RAM. In other examples, the instructions are held in RAM 106 and/or SSD 108. Alternately or additionally, logic for semantic search may be implemented directly in hardware, and/or via instructions held at any other suitable combination of storage devices.

Figure 1B:
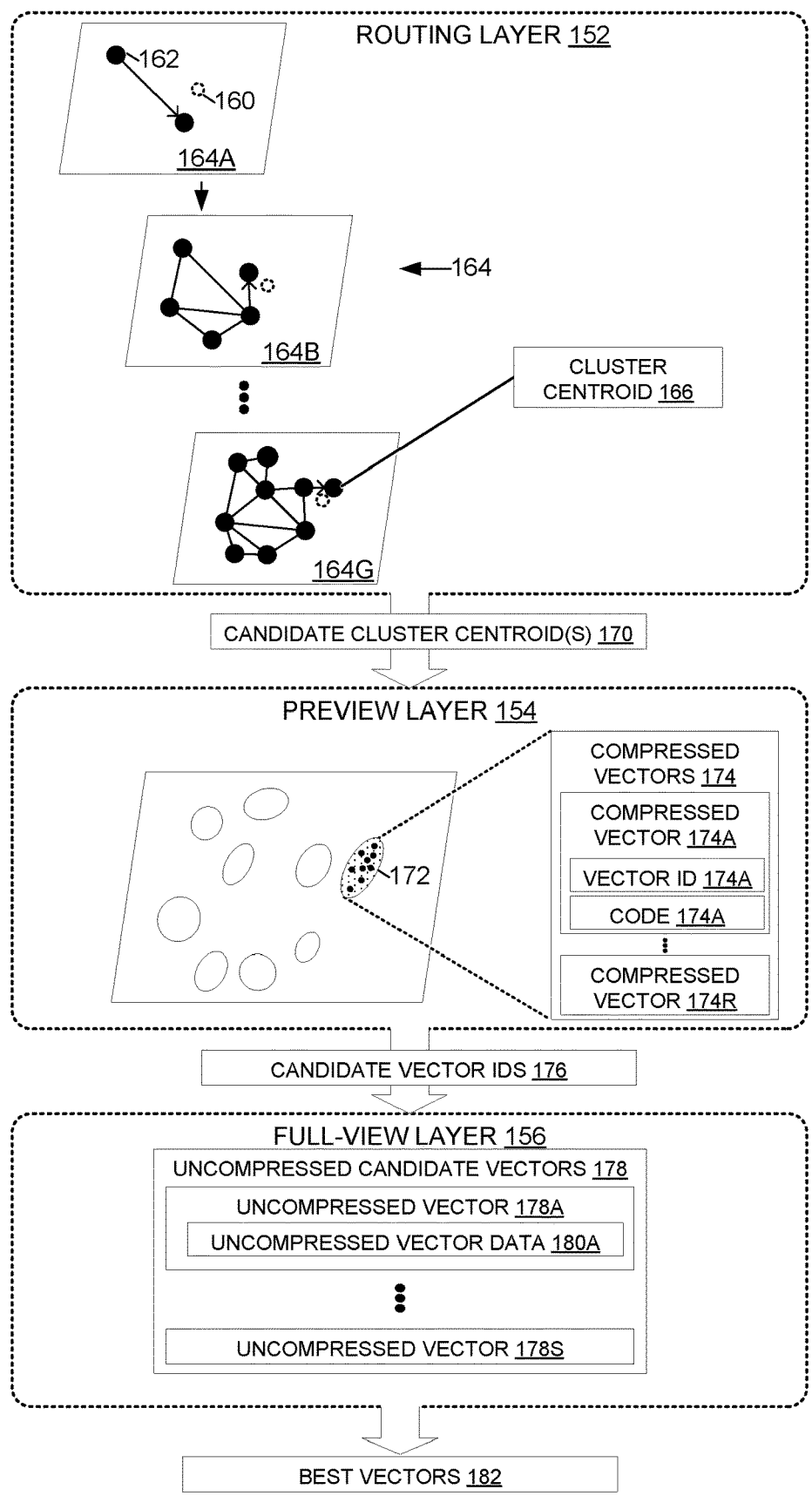
FIG. 1B shows an exemplary computational machine for semantic search.

Semantic search machine 150 is shown in more detail in FIG. 1B. Semantic search machine 150 may be instantiated by executing exemplary method 200, as described further below with regard to FIG. 2.

Routing layer 152 searches for one or more candidate clusters with regard to a query vector 160. Each candidate cluster has a geometric cluster centroid (e.g., cluster centroid 166), Accordingly, finding candidate clusters that are likely to contain true nearest neighbors to the query vector 160 may be based on finding one or more candidate cluster centroid(s) 170, for example based on a geometric relationship (e.g., distance) from the candidate cluster centroid(s) 170 to the query vector 160.

In some examples, searching for the candidate cluster centroid(s) 170 includes searching a graph of cluster centroids 164, e.g., by following edges in the graph based on geometric distance to the query vector. In some examples, as shown in FIG. 1B, the graph of cluster centroids 164 may have multiple layers, e.g., layer 164A, layer 164B, and further layers through ground layer 164G. The layers may be arranged in order, from bottom to top including a ground layer 164G through other higher layers (e.g., layer 164B and layer 164A). The ground layer 164G includes all of the candidate cluster centroids, and each higher layer includes a subset of cluster centroids from an immediately lower layer (e.g., the layers form a chain of subsets of cluster centroids). Cluster centroids at each layer may be linked to the identical cluster centroid in lower/higher layers. Accordingly, by starting at a highest layer, the graph 164 may be navigated to find a cluster centroid close to a query vector 160, without navigating through every candidate cluster.

In some examples, the graph is constructed as a hierarchical navigable small world (HNSW) graph. In examples, the graph may be navigated via greedy search, breadth-first search, depth-first search, beam search, and/or any other suitable graph search methods. For example, the graph may be navigated via greedy and/or beam search at higher layers of the graph, then via prioritized breadth-first search at the ground layer, wherein navigation is prioritized according to distance from the query vector 160.

It is believed that routing via a multi-layer graph may allow finding closest cluster centroids in a runtime that is logarithmic with regard to the number of clusters, resulting in efficient search as compared to, e.g., exhaustive search of cluster centroids.

In an example, the ground layer 164G is built incrementally by iteratively inserting each cluster centroid and generating, for each node, a fixed number of outgoing edges. Of these out-going edges, some are "short-range" edges connecting the new centroid to closest centroids according to pair-wise Euclidean distance. Other edges are "long-range" edges connecting a centroid being added to the graph to a randomly-picked centroid. Further layers may be constructed by sampling a subset of centroids from the ground layer or any other lower layer (e.g., via randomly sampling each node from a lower layer with uniform probability). In some examples, routing graphs constructed in this fashion may have one or more isolated components in higher layers (e.g., centroids with zero in-degree). Accordingly, connectivity of routing graphs may be augmented. In an example, Kosaraju's algorithm is applied on one or more layers of the routing graph, in order to adjust the layer(s) to add a minimal number of edges to make the graph for that layer strongly-connected (in the graph-theoretic sense, e.g., so that there are no zero in-degree nodes).

FIG. 1B depicts an illustrative graph having cluster centroids in a two-dimensional feature space (e.g., cluster centroid 166) connected by edges shown as arrows. Accordingly, based on a query vector 160 located in the same two-dimensional feature space, the graph may be navigated to find a closest cluster centroid. Although FIG. 1B depicts cluster centroids and vectors in a two-dimensional space, the methods of the present disclosure may be applied to vectors in any suitable d-dimensional semantic space where d may be any suitable number (e.g., tens, hundreds, thousands, or more dimensions).

Preview layer 152 searches one or more candidate clusters to find a smaller refined set of candidate vectors. FIG. 1B depicts a single candidate cluster found by routing layer 152, but preview layer 154 may search any suitable number of clusters. Each cluster is defined by a plurality of compressed vectors 174 (e.g., compressed vectors 174A through 174R). Each compressed vector is defined by a vector ID and a vector code.

Compressed answer vectors may be any suitable representation of semantic vectors in a semantic feature space. FIG. 1C shows an exemplary schematic for compressed vectors 184.

Compressed vectors 184 each include a vector ID (e.g., vector ID 186A for compressed vector 184A) and a code (e.g., code 188A for compressed vector 184A). Compressed answer vectors are typically encoded to reduce space required to store the compressed answer vectors and/or to enable methods of search with reduced latency, relative to uncompressed answer vectors. Compressed answer vectors may use any suitable lossy or lossless compressed representation. In some examples, compressed answer vectors may be encoded using a product-quantization code.

In an exemplary product quantization code, an m-dimensional uncompressed candidate vector 194A may be encoded as a compressed vector 184A having a code 188A made up of m k-dimensional codepoints 188A[1] through 188A[K], each codepoint representing a vector with regard to a k-dimensional subspace. Accordingly, the Cartesian product (e.g., concatenation) of the m codepoints may be used to reconstitute an approximation of the uncompressed candidate vector 194A. Each codepoint (e.g., codepoint 188A[1]) in the code 188A is stored as an index, indicating a vector in a codebook particular to a particular k dimensional subspace defined by a codebook from the product-quantization code, e.g., codebook 190A for a first subspace corresponding to codepoint 188A[1], and further codebooks through codebook 190M making up a plurality of codebooks 190. Accordingly, the vector is "quantized" by selecting a particular vector in the codebook for each dimension. In some examples, selection of the vector in the codebook for each dimension may be based on closest geometric distance for codepoints in the codebook in each subspace. In many examples, product-quantization compressed vectors may represent uncompressed vectors lossily, so that compressed vectors may be reconstituted to recover uncompressed vectors subject to a reconstitution error.

In some examples, the codebooks 190 may be learned with regard to the k different m/k-dimensional subspaces based on a plurality of different uncompressed candidate vectors 194 to reduce reconstitution errors, e.g., by selecting code points in each codebook to minimize a sum of reconstitution errors across the plurality of different uncompressed candidate vectors or in any other suitable fashion (e.g., via any suitable combination of AI and/or ML models). In some examples, the codebook may be learned by performing Lloyd's algorithm, or any other suitable algorithm for product-quantization codebook learning. Compressed vectors according to a product-quantization code may be represented by storing the vector index (e.g., for retrieving corresponding uncompressed vectors) and a code-point for each sub-space. Accordingly, depending on the number of entries in each code-book and the number of sub-spaces, compressed vectors may be stored in a substantially smaller space relative to uncompressed vectors.

For any semantic space defined by a plurality of semantic feature dimensions, a geometric distance function may be defined (e.g., Euclidean distance, or any other suitable distance function). The geometric distance function may be used to calculate the geometric distance between a query vector and a cluster centroid. Furthermore, the same geometric distance function may be used to define a compressed vector distance between the query vector and compressed answer vectors, and/or the uncompressed vector distance between the query vector and the corresponding uncompressed answer vector.

Figure 1D:
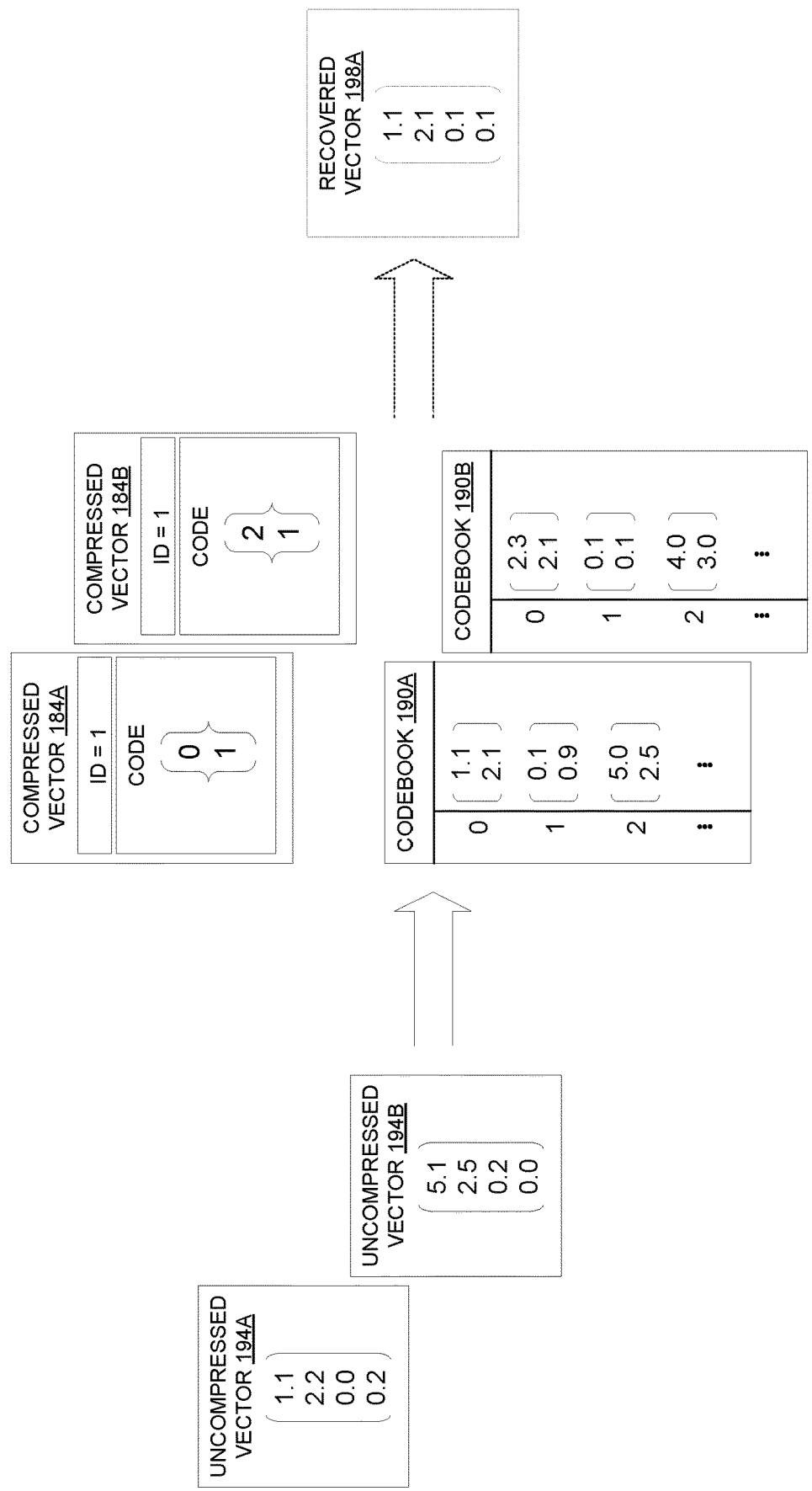
FIG. 1D shows an exemplary compression scheme with regard to exemplary answer vectors.

FIG. 1D shows an example of uncompressed and compressed vectors according to a product-quantization code in which 4-dimensional uncompressed vectors are represented by 2 code-points in 2 subspaces, each having 2 dimensions. Two uncompressed vectors, uncompressed vector 194A and uncompressed vector 194B are shown along with corresponding compressed vectors 184A and compressed vector 184B, as well as codebooks used for the 2 subspaces, codebook 190A for the subspace representing the first two dimensions of the semantic space, and codebook 190B for the subspace representing the remaining two dimensions of the semantic space. FIG. 1D also shows an exemplary recovered vector 198A that could be generated from the compressed vector 184A using the codebooks. As shown, the codebooks have entries that can be used to approximately represent the uncompressed vectors. For example, uncompressed vector 184A can be represented by the $0^{th}$ and $1^{st}$ entry in codebooks 184A and 184B respectively, and could be recovered as recovered vector 198A. Although FIG. 1D shows only two vectors, the codebooks may be learned with regard to any suitable number of vectors. Although FIG. 1D shows substantial differences between uncompressed vector 194A and recovered vector 198A (e.g., difference of 0.1 in the third and fourth component due to a lossy encoding), codebooks may be learned to achieve any suitable accuracy (e.g., by varying a number of dimensions for each subspace, and/or number of entries in the codebook).

In some examples, compressed answer vectors may be encoded with regard to residual vectors computed based on a difference from a cluster centroid vector, e.g., via a two-level product-quantization code. For example, compressed answer vectors encoded based on residual vectors may accurately represent fine differences from a cluster centroid. In an example, compressed answer vectors are encoded using product-quantization codes for residuals with regard to cluster centroids, using code-books learned for the cluster centroids and subspaces in the product-quantization code. Accordingly, each compressed answer vector of a candidate cluster is defined as a plurality of codeword sub-vectors according to the product quantization code, each sub-vector representing a residual vector defined by a difference between the compressed answer vector and the cluster centroid of the candidate, with regard to a particular m/k-dimensional subspace of the semantic space.

Returning briefly to FIG. 1A, semantic search machine 150 is configured to use a relatively fast memory (e.g., RAM) for data used by routing layer 152 and preview layer 154, in order to achieve desired latency for semantic search. Accordingly, RAM 106 is configured to hold a plurality of candidate clusters 110, and for each candidate cluster, a plurality of compressed answer vectors that collectively have a cluster centroid (e.g., cluster centroid 112A). Each cluster is defined by a cluster centroid and a plurality of vectors which are associated with that cluster centroid via a geometric relationship in the semantic space, e.g., geometrically closest to the centroid. For example, cluster 110A is defined by a cluster centroid 112A and a plurality of compressed vectors 114A. Any suitable number of other clusters, e.g., clusters 110B through 110K may be similarly defined. Clusters (e.g., centroids and associated vectors) may be determined in any suitable fashion, e.g., via k-means clustering or any variant thereof, such as YinYang k-means. In the preview layer 154 of the semantic search machine 150, compressed answer vectors may be loaded from RAM 106 for selection to produce a smaller refined set of answers that are geometrically related to a query vector, with relatively small latency (e.g., compared to loading uncompressed vectors).

Returning to FIG. 1C, uncompressed candidate vectors 194 may be encoded to produce compressed vectors 184, based on codebooks 190 learned for the uncompressed candidate vectors 194. Compressed answer vectors may be searched according to geometric relationships with a query vector, working mathematically with the compressed format (e.g., product-quantization code). However, due to possible lossy representation of compressed answer vectors, although the smaller refined set of answers likely contains a true nearest neighbor to the query vector, the lossy representation may not facilitate accurate identification of the true nearest neighbor (e.g., because multiple different lossy representations of vectors may be equally close to the query vector, or because distances of vectors from the query vector may be ordered inaccurately when measured with regard to the lossy representation).

As shown in FIG. 1C, the plurality of uncompressed answer vectors 194 may be indexed by vector IDs (e.g., a vector 194A may be stored in a relatively slower memory (e.g., SSD) at an address determined by a vector ID 186A, facilitating lookup based on the vector ID 186A, as shown in FIG. 1C). Accordingly, returning briefly to FIG. 1A, SSD 108 is configured to hold a plurality of uncompressed answer vectors, which may be indexed according to vector IDs in any suitable fashion. Accordingly, since compressed vectors include vector IDs, compressed vectors may be used to efficiently lookup uncompressed vectors from the SSD based on ID. Although FIG. 1C is described with regard to storing/addressing uncompressed vectors in SSD, alternately or additionally any other memory technology may be used.

In some examples, the relatively fast, primary memory device may be a volatile memory device (e.g., as with RAM). For example, the relatively fast memory device may be configured to hold data only while kept in a powered state, and may be subject to potential loss of data when put into a non-powered state or a reduced power state. In some examples, the relatively slower, auxiliary memory device may be a non-volatile memory device (e.g., as with SSD). For example, the relatively slower memory may be configured to hold data even when non-powered. Accordingly, in some examples, runtime power consumption costs for holding data in the relatively fast memory may differ from runtime power consumption costs for holding equivalent quantities of data in the relatively slow memory, e.g., because the relatively fast memory must be kept in a powered state for the duration in which the data is held.

Returning briefly to FIG. 1B, the full-view layer 156 is configured to search the uncompressed candidate vectors 178 by loading full uncompressed vector data for each vector indicated in the set of candidate vector IDs 176. In the full-view layer 156, the uncompressed candidate vectors 178 are compared with regard to distance from the query vector. The refined set of vectors can be exhaustively compared to the query vector, with regard to the true geometric relationship (e.g., distance) to the query vector. Accordingly, if the refined smaller set of semantic vectors indicated by the candidate vector IDs 176 and loaded as uncompressed candidate vectors 178 contains the true nearest neighbor to the query, it will be found deterministically by full-view layer 156. Accordingly, the full-view layer 156 returns one or more best vectors 182 that are highly likely to include the true nearest neighbor of the query vector 160.

FIG. 2 shows an exemplary method 200 for carrying out a semantic search machine as described above. At 202, method 200 includes receiving a query vector. The query value includes a semantic value for each semantic feature dimension of a semantic space defined by a plurality of semantic feature dimensions. Accordingly, the semantic space admits a geometric distance function used to calculate the geometric distance between the query vector and the cluster centroid, the compressed vector distance between the query vector and the compressed answer vector, and the uncompressed vector distance between the query vector and the corresponding uncompressed answer vector.

At 204, method 200 includes finding a selected cluster from a plurality of different candidate clusters. In examples, each candidate cluster includes a plurality of compressed answer vectors that collectively have a cluster centroid, wherein the selected cluster is found based on a geometric distance between the query vector and the cluster centroid of the selected cluster. Accordingly, finding the selected cluster may be based on searching a routing graph including a plurality of cluster centroids, as described above with regard to FIGS. 1A-1D. As shown at 206, in some examples, the selected cluster is one of a plurality of selected clusters. Accordingly, candidate answers may be drawn from the plurality of selected clusters.

As shown at 208, the plurality of candidate clusters (e.g., all of the clusters being searched including the plurality of compressed answer vectors for each cluster and cluster centroids for each cluster) may be held in a relatively fast memory (e.g., RAM). Accordingly, since all of the candidate clusters being searched are held in the relatively fast memory, latency to access the cluster centroids and/or compressed answer vectors of each cluster may be relatively small, e.g., as compared to semantic search approaches in which candidate clusters/candidate vectors are held using alternative memory technologies with higher latencies and/or worse random access characteristics. Similarly, the one or more selected cluster(s) may be held in the relatively fast memory, for example, by maintaining a collection (e.g., priority queue) of indices indicating the selected cluster(s).

In some examples, finding the selected cluster includes navigating a graph of cluster centroids for the candidate clusters based on the geometric distance between the query vector and cluster centroids in the graph, e.g., a multi-layered routing graph as described above with regard to FIG. 1B. Accordingly, the graph of cluster centroids may include a plurality of graph layers including a ground layer and a plurality of higher layers, wherein the ground layer includes a cluster centroid for each of the plurality of candidate clusters, and wherein each higher layer includes a subset of cluster centroids of a lower layer. In some examples, the plurality of clusters may be tracked in a priority queue, e.g., by searching a fixed number of clusters in a breadth-first search in a ground layer of the routing graph, adding clusters to the priority queue prioritized by cluster centroid distance to the query vector, and returning the top K candidate clusters from the priority queue (for any suitable value of K).

Accordingly, navigating the graph of cluster centroids may include performing a greedy search based on geometric distances between the query vector and cluster centroids in higher layers of the graph, to find a starting centroid in a ground layer of the graph, and performing a prioritized breadth-first search based on geometric distances between the query vector and cluster centroids in the ground layer of the graph starting from the starting centroid. In some examples, performing the prioritized breadth-first search includes maintaining a priority queue of candidate cluster centroids prioritized based on geometric distance from the query vector, and until a stopping condition is met, adding a plurality of cluster centroids to the priority queue. After the stopping condition is met, one or more best cluster centroids are returned, based on position in the priority queue.

At 210, method 200 includes promoting a subset of the plurality of compressed answer vectors from the selected cluster(s) as candidate answers. For example, when more than one cluster is selected, the candidate answers may include a subset of compressed answer vectors from a first cluster and further include a subset of a plurality of compressed answer vectors of a different cluster. The plurality of compressed answer vectors may be indicated as vector IDs, thereby facilitating lookup of uncompressed answer vectors. In some examples, the subset of the plurality of compressed answer vectors may be tracked in a priority queue, e.g., by searching a fixed number of vectors from the selected cluster(s) and returning the top R candidate vectors from the queue after searching the fixed number of vectors (for any suitable value of R).

In some examples, promoting the subset of the plurality of compressed answer vectors is based on calculating a compressed vector distance between the query vector and the compressed answer vector, for each of the plurality of compressed answer vectors in the selected cluster. Accordingly, promoting a subset of the plurality of compressed answer vectors as candidate answers is based on the calculated compressed vector distances (e.g., promoting compressed answer vectors that have a closest geometric distance to the query vector).

In some examples, a compressed answer vector of a candidate cluster is defined as a plurality of codeword sub-vectors according to a product quantization code, the sub-vectors representing a residual vector defined by a difference between the compressed answer vector and the cluster centroid of the candidate cluster. Accordingly, calculating the compressed vector distance between the query vector and the compressed answer vector may be based on an asymmetric distance computation defined with regard to the product-quantization code. Accordingly, the asymmetric distance computation may enable fast processing of distances for compressed answer vectors with regard to the query vector. For example, for a vector y in cluster $V_i$, the distance to a query vector q may be computed using the product quantization code for y and an asymmetric distance function $d(q, y) = d(q-c, r)$, where c is the cluster center for the cluster and r is the residual distance between y and c, represented as a plurality of residual values for each semantic feature dimension.

$d(q, y) = d(q-c, r)$ may be approximated as a distance between q−c and the product-quantization approximation of r, e.g., the concatenation of a plurality of code-points indicated by the compressed vector representing y. This distance may be computed as the Euclidean norm, e.g., sum of distances from each sub-vectors of q−c corresponding to each subspace in the product-quantization code to the code-point used to represent the compressed vector with regard to that subspace, which in turn can be expanded in to computing four terms to compute the Euclidean norm:

Term 1) $\|q-c\|^2$, e.g., a distance from the query to the cluster centroid.

Term 2) $\Sigma_{m \in M} \|c_{y_m}^m\|$ (norm of the closest sub-word $c_{y_m}^m$ selected as a code-point for each sub-space m of the product-quantization code, summed over all subspaces m of the M subspaces in the product-quantization code), e.g., a sum of vector norm terms for each of the plurality of codeword sub-vectors in the product quantization code.

Term 3) $2\Sigma_{m \in M} \langle c_{y_m}^m, c^m \rangle$, (proportional to the distance between the closest sub-word $c_{y_m}^m$ selected as a code-point for each sub-space m of the product-quantization code from the sub-vector $c^m$ of the cluster centroid, summed over all subspaces m of the M subspaces in the product-quantization code), e.g., a sum of vector dot product terms for vector dot products between each of the plurality of codeword sub-vectors in the product quantization code and a corresponding centroid sub-vector of the cluster centroid of the candidate cluster.

Term 4) $2\Sigma_{m \in E} \langle q^m, c_{y_m}^m \rangle$, (proportional to the distance between the closest sub-word $c_{y_m}^m$ selected as a code-point for each sub-space m of the product-quantization code from the sub-vector $q^m$ of the query vector, summed over all subspaces m of the M subspaces in the product-quantization code).

Terms 2) and 3) above are query independent, and may be precalculated. Accordingly, as an example, the asymmetric distance computation includes calculating query dependent terms and query independent, compressed answer vector dependent terms. Because the query independent, compressed answer vector dependent terms can be fully determined based on the compressed answer vectors irrespective of queries, these terms can be precalculated (e.g., to reduce computation time). Accordingly, method 200 may include precalculating a plurality of query independent, compressed answer vector dependent terms for the plurality of compressed answer vectors. Such precalculation can be performed at any suitable time, e.g., before receiving any query vectors. Accordingly, the precalculated query independent, compressed answer vector dependent terms may be used for the asymmetric distance calculation. In an example, the query independent, compressed answer vector dependent terms for a compressed answer vector of a candidate cluster include one or both of: term 2) a sum of vector norm terms for each of the plurality of codeword sub-vectors in the product quantization code or term 3) a sum of vector dot product terms for vector dot products between each of the plurality of codeword sub-vectors in the product quantization code and a corresponding centroid sub-vector of the cluster centroid of the candidate cluster. The pre-calculated results may be stored in any suitable fashion, e.g., look-up tables.

At 212, method 200 includes, for each candidate answer, retrieving a corresponding uncompressed answer. As shown at 214, the uncompressed answers may be held in a relatively slower memory (e.g., an SSD or any other relatively slower memory, as compared to the relatively fast memory). For example, the uncompressed answers may be stored in the relatively slower memory addressed by vector ID, facilitating retrieval based on the vector ID. At 216, method 200 includes promoting a selected answer from among the candidate answers. In some examples, the selected answer is one of a plurality of selected answers. For example, a plurality of selected answers may be tracked in a priority queue and the top S selected answers may be returned as final answers. The selected answer(s) are promoted based on calculating an uncompressed vector distance to the query vector, e.g., Euclidean distance in the semantic space.

In some examples, uncompressed vectors are stored in the relatively slower memory and are retrieved asynchronously (e.g., in parallel) while performing distance calculations, thereby enabling reduction in overall latency incurred by waiting on retrieval from the relatively slower memory, and improving overall throughput. Accordingly, calculating the uncompressed vector distance between the query vector and a first uncompressed vector is performed in parallel with asynchronously retrieving a second uncompressed vector from the relatively slower memory. In some examples, a plurality of uncompressed answer vectors is retrieved from the relatively slower memory in a single batch, using a batch mode. For example, SSD devices may support efficient batch operations, wherein overall throughput is increased by retrieving a plurality of data addresses in a batch.

In some examples, uncompressed answer vectors retrieved during search may not have substantial spatial and/or temporal locality for retrieval, so storage of pages of data from the relatively slower memory in the system page cache (e.g., in a portion of the relatively fast memory, such as RAM) would incur a memory cost without providing substantial decreases in latency to lookup a typical uncompressed answer vector. Accordingly, the relatively slower memory is configured to bypass a system page cache when retrieving uncompressed answer vectors. Bypassing the system page cache may decrease overall memory requirements (e.g., RAM requirements) for semantic search.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 3:
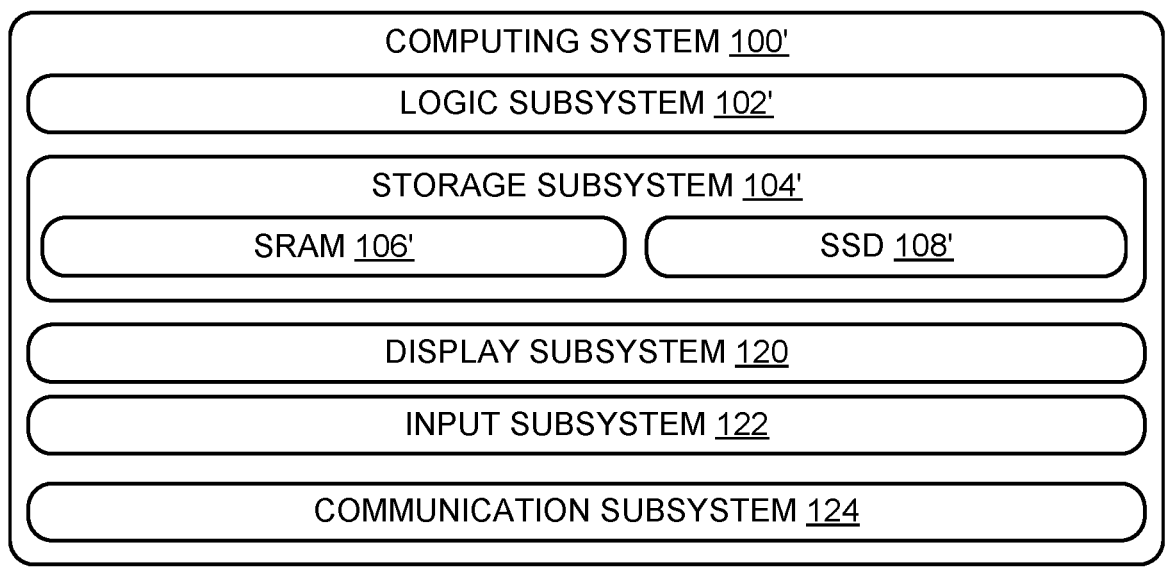
FIG. 3 shows an exemplary computer system.

FIG. 3 schematically shows a simplified representation of a computing system 100' configured to provide any to all of the compute functionality described herein, e.g., semantic search machine 150 and method 200. Computing system 100' may take the form of one or more network-accessible server computers, Internet of Things (IoT) devices, embedded computing devices, personal computers, tablet computers, home-entertainment computers, gaming devices, mobile computing devices, mobile communication devices (e.g., smart phone), virtual/augmented/mixed reality computing devices, wearable computing devices, and/or other computing devices. For example, computing system 100' may be computing system 100 as shown in FIG. 1A.

Computing system 100' includes a logic subsystem 102' and a storage subsystem 104'. Computing system 100' may optionally include a display subsystem 120, input subsystem 122, communication subsystem 124, and/or other subsystems not shown in FIG. 3.

Logic subsystem 102' includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 104' includes one or more physical devices configured to temporarily and/or permanently hold computer information such as data and instructions executable by the logic subsystem. When the storage subsystem includes two or more devices, the devices may be collocated and/or remotely located. Storage subsystem 104' may include volatile, nonvolatile, dynamic, static, read/write, read-only, random-access, sequential-access, location-addressable, file-addressable, and/or content-addressable devices. For example, storage subsystem may include RAM 106') and/or SSD 108' (and/or any other combination of relatively fast and relatively slower storage devices). Storage subsystem 104' may include removable and/or built-in devices. When the logic subsystem executes instructions, the state of storage subsystem 104' may be transformed—e.g., to hold different data.

Aspects of logic subsystem 102' and storage subsystem 104' may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices. For example, computing system 100' may be configured to instantiate a semantic search machine 150, as shown in FIG. 1A and as further detailed in FIG. 1B.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

Any combination of AI and/or ML models, differentiable functions, statistical models, etc., may be used to generate semantic vectors in a semantic feature space. Furthermore, AI and/or ML models may be used to pre- and/or post-process semantic vectors (e.g., semantic vectors identified by search). In some examples, semantic search may be used as a step in an AI and/or ML machine (e.g., to search among inputs, intermediate values, and/or outputs of other components of the AI and/or ML machine).

When included, display subsystem 122 may be used to present a visual representation of data held by storage subsystem 104'. This visual representation may take the form of a graphical user interface (GUI). Display subsystem 122 may include one or more display devices utilizing virtually any type of technology. In some implementations, display subsystem may include one or more virtual-, augmented-, or mixed reality displays.

When included, input subsystem 120 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 124 may be configured to communicatively couple computing system 100' with one or more other computing devices. Communication subsystem 124 may include wired and/or wireless communication devices compatible with one or more different communication protocols. The communication subsystem may be configured for communication via personal-, local- and/or wide-area networks.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user owning the data should be notified, and the user data should only be collected when the user provides affirmative consent. If data is to be collected, it can and should be collected with the utmost respect for user privacy. If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components can and should be trained on diverse, representative datasets that include sufficient relevant data for diverse users and/or populations of users. In particular, training data sets should be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components can and should be designed to provide context as to how they operate, so that implementers of ML and/or AI systems can be accountable for decisions/assessments made by the systems. For example, ML and/or AI systems should have replicable behavior, e.g., when they make pseudo-random decisions, random seeds should be used and recorded to enable replicating the decisions later. As another example, data used for training and/or testing ML and/or AI systems should be curated and maintained to facilitate future investigation of the behavior of the ML and/or AI systems with regard to the data. Furthermore, ML and/or AI systems can and should be continually monitored to identify potential bias, errors, and/or unintended outcomes.

In an example, a method for semantic search comprises: receiving a query vector including a semantic feature value for each of a plurality of semantic feature dimensions; finding a selected cluster from a plurality of different candidate clusters, each candidate cluster including a plurality of compressed answer vectors that collectively have a cluster centroid, wherein the selected cluster is found based on a geometric distance between the query vector and the cluster centroid of the selected cluster; for each of the plurality of compressed answer vectors in the selected cluster, calculating a compressed vector distance between the query vector and the compressed answer vector; promoting a subset of the plurality of compressed answer vectors as candidate answers based on the calculated compressed vector distances; for each of the candidate answers, retrieving a corresponding uncompressed answer vector and calculating an uncompressed vector distance between the query vector and the corresponding uncompressed answer vector; and promoting a selected answer from the candidate answers based on the uncompressed vector distance between the query vector and the corresponding uncompressed answer vector. In this or any other example, the plurality of compressed answer vectors are held in a random-access memory (RAM) device, and the uncompressed answer vectors are held in a solid-state drive (SSD). In this or any other example, the uncompressed answer vectors are retrieved asynchronously from the SSD. In this or any other example, calculating the uncompressed vector distance between the query vector and a first uncompressed vector is performed in parallel with asynchronously retrieving a second uncompressed vector from the SSD. In this or any other example, a plurality of uncompressed answer vectors are retrieved from the SSD in a single batch, using a batch mode of the SSD. In this or any other example, the SSD is configured to bypass a system page cache when retrieving uncompressed answer vectors. In this or any other example, the plurality of semantic feature dimensions defines a semantic space having a geometric distance function used to calculate the geometric distance between the query vector and the cluster centroid, the compressed vector distance between the query vector and the compressed answer vector, and the uncompressed vector distance between the query vector and the corresponding uncompressed answer vector. In this or any other example, the selected cluster is one of a plurality of selected clusters, and wherein the candidate answers further include a subset of a plurality of compressed answer vectors of a different cluster of the plurality of selected clusters. In this or any other example, a compressed answer vector of a candidate cluster is defined as a plurality of codeword sub-vectors according to a product quantization code, the sub-vectors representing a residual vector defined by a difference between the compressed answer vector and the cluster centroid of the candidate cluster. In this or any other example, calculating the compressed vector distance between the query vector and the compressed answer vector is based on an asymmetric distance computation. In this or any other example, the asymmetric distance computation includes calculating query dependent terms and query independent, compressed answer vector dependent terms, the method further including precalculating a plurality of query independent, compressed answer vector dependent terms for the plurality of compressed answer vectors, and using the precalculated query independent, compressed answer vector dependent terms for the asymmetric distance calculation. In this or any other example, the query independent, compressed answer vector dependent terms for a compressed answer vector of a candidate cluster include one or both of: 1) a sum of vector norm terms for each of the plurality of codeword sub-vectors in the product quantization code or 2) a sum of vector dot product terms for vector dot products between each of the plurality of codeword sub-vectors in the product quantization code and a corresponding centroid sub-vector of the cluster centroid of the candidate cluster. In this or any other example, finding the selected cluster includes navigating a graph of cluster centroids for the candidate clusters based on the geometric distance between the query vector and cluster centroids in the graph. In this or any other example, the graph of cluster centroids includes a plurality of graph layers including a ground layer and a plurality of higher layers, wherein the ground layer includes a cluster centroid for each of the plurality of candidate clusters, and wherein each higher layer includes a subset of cluster centroids of a lower layer. In this or any other example, navigating the graph of cluster centroids includes: performing a greedy search based on geometric distances between the query vector and cluster centroids in higher layers of the graph, to find a starting centroid in a ground layer of the graph; and performing a prioritized breadth-first search based on geometric distances between the query vector and cluster centroids in the ground layer of the graph starting from the starting centroid. In this or any other example, performing the prioritized breadth-first search includes: maintaining a priority queue of candidate cluster centroids prioritized based on geometric distance from the query vector; until a stopping condition is met, adding a plurality of cluster centroids to the priority queue; and after the stopping condition is met, returning one or more best cluster centroids based on position in the priority queue.

In an example, a computer system comprises: a logic subsystem; and a storage subsystem, the storage subsystem including: a random-access memory (RAM) configured to hold a plurality of candidate clusters, and for each candidate cluster, a plurality of compressed answer vectors that collectively have a cluster centroid; and a solid state drive (SSD) configured to hold a plurality of uncompressed answer vectors; wherein the storage subsystem holds instructions executable by the logic subsystem to: receive a query vector including a semantic feature value for each of a plurality of semantic feature dimensions; find a selected cluster from the plurality of different candidate clusters, wherein the selected cluster is found based on a geometric distance between the query vector and the cluster centroid of the selected cluster; retrieve a plurality of compressed answer vectors in the selected cluster from the RAM; for each of the plurality of compressed answer vectors in the selected cluster, calculate a compressed vector distance between the query vector and the compressed answer vector; promote a subset of the plurality of compressed answer vectors as candidate answers based on the calculated compressed vector distances; for each of the candidate answers, retrieve a corresponding uncompressed answer vector from the SSD, and calculate an uncompressed vector distance between the query vector and the corresponding uncompressed answer vector; and promote a selected answer from the candidate answers based on the uncompressed vector distance between the query vector and the corresponding uncompressed answer vector.

In an example, a method for semantic search comprises: receiving a query vector including a semantic feature value for each of a plurality of semantic feature dimensions; finding a selected cluster from a plurality of different candidate clusters held in a random-access memory (RAM), each candidate cluster including a plurality of compressed answer vectors; promoting a subset of the plurality of compressed answer vectors as candidate answers; for each of the candidate answers, retrieving a corresponding uncompressed answer vector from a solid state drive (SSD); and promoting a selected answer from the candidate answers. In this or any other example, the method further comprises: for each of the plurality of compressed answer vectors in the selected cluster, calculating a compressed vector distance between the query vector and the compressed answer vector, wherein: the plurality of compressed answer vectors collectively have a cluster centroid, the selected cluster is found based on a geometric distance between the query vector and the cluster centroid of the selected cluster, and the candidate answers are selected based on the calculated compressed vector distances. In this or any other example, the method further comprises: calculating an uncompressed vector distance between the query vector and the corresponding uncompressed answer vector, wherein the selected answer from the candidate answers is selected based on the uncompressed vector distance between the query vector and the corresponding uncompressed answer vector.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for semantic search, comprising:
receiving a query vector including a semantic feature value for each of a plurality of semantic feature dimensions;
finding a selected cluster from a plurality of different candidate clusters, each candidate cluster including a plurality of compressed answer vectors that collectively have a cluster centroid, wherein the selected cluster is found based on a geometric distance between the query vector and the cluster centroid of the selected cluster;
for each of the plurality of compressed answer vectors in the selected cluster, calculating a compressed vector distance between the query vector and the compressed answer vector; promoting a subset of the plurality of compressed answer vectors as candidate answers based on the calculated compressed vector distances;
for each of the candidate answers, retrieving a corresponding uncompressed answer vector and calculating an uncompressed vector distance between the query vector and the corresponding uncompressed answer vector; and
promoting a selected answer from the candidate answers based on the uncompressed vector distance between the query vector and the corresponding uncompressed answer vector.

2. The method of claim 1, wherein the plurality of compressed answer vectors are held in a random-access memory (RAM) device, and the uncompressed answer vectors are held in a solid-state drive (SSD).

3. The method of claim 2, wherein the uncompressed answer vectors are retrieved asynchronously from the SSD.

4. The method of claim 3, wherein calculating the uncompressed vector distance between the query vector and a first uncompressed vector is performed in parallel with asynchronously retrieving a second uncompressed vector from the SSD.

5. The method of claim 2, wherein a plurality of uncompressed answer vectors are retrieved from the SSD in a single batch, using a batch mode of the SSD.

6. The method of claim 2, wherein the SSD is configured to bypass a system page cache when retrieving uncompressed answer vectors.

7. The method of claim 1, wherein the plurality of semantic feature dimensions defines a semantic space having a geometric distance function used to calculate the geometric distance between the query vector and the cluster centroid, the compressed vector distance between the query vector and the compressed answer vector, and the uncompressed vector distance between the query vector and the corresponding uncompressed answer vector.

8. The method of claim 1, wherein the selected cluster is one of a plurality of selected clusters, and wherein the candidate answers further include a subset of a plurality of compressed answer vectors of a different cluster of the plurality of selected clusters.

9. The method of claim 1, wherein a compressed answer vector of a candidate cluster is defined as a plurality of codeword sub-vectors according to a product quantization code, the sub-vectors representing a residual vector defined by a difference between the compressed answer vector and the cluster centroid of the candidate cluster.

10. The method of claim 9, wherein calculating the compressed vector distance between the query vector and the compressed answer vector is based on an asymmetric distance computation.

11. The method of claim 10, wherein the asymmetric distance computation includes calculating query dependent terms and query independent, compressed answer vector dependent terms, the method further including precalculating a plurality of query independent, compressed answer vector dependent terms for the plurality of compressed answer vectors, and using the precalculated query independent, compressed answer vector dependent terms for the asymmetric distance calculation.

12. The method of claim 11, wherein the query independent, compressed answer vector dependent terms for a compressed answer vector of a candidate cluster include one or both of: 1) a sum of vector norm terms for each of the plurality of codeword sub-vectors in the product quantization code or 2) a sum of vector dot product terms for vector dot products between each of the plurality of codeword sub-vectors in the product quantization code and a corresponding centroid sub-vector of the cluster centroid of the candidate cluster.

13. The method of claim 1, wherein finding the selected cluster includes navigating a graph of cluster centroids for the candidate clusters based on the geometric distance between the query vector and cluster centroids in the graph.

14. The method of claim 13, wherein the graph of cluster centroids includes a plurality of graph layers including a ground layer and a plurality of higher layers, wherein the ground layer includes a cluster centroid for each of the plurality of candidate clusters, and wherein each higher layer includes a subset of cluster centroids of a lower layer.

15. The method of claim 14, wherein navigating the graph of cluster centroids includes:
performing a greedy search based on geometric distances between the query vector and cluster centroids in higher layers of the graph, to find a starting centroid in a ground layer of the graph; and
performing a prioritized breadth-first search based on geometric distances between the query vector and cluster centroids in the ground layer of the graph starting from the starting centroid.

16. The method of claim 9, wherein performing the prioritized breadth-first search includes:
maintaining a priority queue of candidate cluster centroids prioritized based on geometric distance from the query vector;
until a stopping condition is met, adding a plurality of cluster centroids to the priority queue; and
after the stopping condition is met, returning one or more best cluster centroids based on position in the priority queue.

17. A computer system, comprising:
a logic subsystem; and
a storage subsystem, the storage subsystem including:
first memory of a first type that is configured to hold a plurality of candidate clusters, and for each candidate cluster, a plurality of compressed answer vectors that collectively have a cluster centroid; and
second memory of a second type that is configured to hold a plurality of uncompressed answer vectors;

wherein the storage subsystem holds instructions executable by the logic subsystem to:
receive a query vector including a semantic feature value for each of a plurality of semantic feature dimensions;
find a selected cluster from the plurality of different candidate clusters, wherein the selected cluster is found based on a geometric distance between the query vector and the cluster centroid of the selected cluster;
retrieve a plurality of compressed answer vectors in the selected cluster from the first memory;
for each of the plurality of compressed answer vectors in the selected cluster, calculate a compressed vector distance between the query vector and the compressed answer vector;
promote a subset of the plurality of compressed answer vectors as candidate answers based on the calculated compressed vector distances;
for each of the candidate answers, retrieve a corresponding uncompressed answer vector from the second memory, and calculate an uncompressed vector distance between the query vector and the corresponding uncompressed answer vector; and
promote a selected answer from the candidate answers based on the uncompressed vector distance between the query vector and the corresponding uncompressed answer vector.

18. A method for semantic search, comprising:
receiving a query vector including a semantic feature value for each of a plurality of semantic feature dimensions;
finding a selected cluster from a plurality of different candidate clusters held in a first memory of a first type, each candidate cluster including a plurality of compressed answer vectors;
promoting a subset of the plurality of compressed answer vectors as candidate answers; for each of the candidate answers, retrieving a corresponding uncompressed answer vector from second memory of a second type;
calculating an uncompressed vector distance between the query vector and the corresponding uncompressed answer vector; and
promoting a selected answer from the candidate answers, wherein the selected answer from the candidate answers is selected based on the uncompressed vector distance between the query vector and the corresponding uncompressed answer vector.

19. The method of claim 18, further comprising:
for each of the plurality of compressed answer vectors in the selected cluster, calculating a compressed vector distance between the query vector and the compressed answer vector, wherein:
the plurality of compressed answer vectors collectively have a cluster centroid,
the selected cluster is found based on a geometric distance between the query vector and the cluster centroid of the selected cluster, and
the candidate answers are selected based on the calculated compressed vector distances.

20. The method of claim 18, wherein the first memory of the first type is Random Access Memory (RAM), and the second memory of the second type is a Solid State Drive (SSD).

* * * * *